United States Patent [19]
Aoyagi et al.

[11] Patent Number: 4,865,432
[45] Date of Patent: Sep. 12, 1989

[54] LENS MOUNTING

[75] Inventors: Masao Aoyagi; Ryuji Suzuki, both of Kanagawa; Shigeru Kamata; Keiichi Yasuda, both of Tokyo, all of Japan

[73] Assignee: Canon Kabushiki Kaisha, Tokyo, Japan

[21] Appl. No.: 18,082

[22] Filed: Feb. 24, 1987

[30] Foreign Application Priority Data

Feb. 26, 1986 [JP] Japan .......................... 61-027140[U]
Jun. 2, 1986 [JP] Japan .......................... 61-083850[U]
Jun. 5, 1986 [JP] Japan .......................... 61-086010[U]

[51] Int. Cl.4 .......................... G02B 15/00; G02B 7/02
[52] U.S. Cl. .................................. 350/429; 354/400; 350/255
[58] Field of Search ............... 350/429, 252, 255, 257, 350/430; 354/286, 295, 400, 195.13; 310/90, 91

[56] References Cited

U.S. PATENT DOCUMENTS

| 3,090,282 | 5/1963 | Angenieux | 350/429 |
| 4,083,057 | 4/1978 | Quinn | 350/429 |
| 4,119,364 | 10/1978 | Takahashi | 350/429 |
| 4,256,371 | 3/1981 | Someya | 350/429 |
| 4,359,276 | 11/1982 | Tomori | 354/400 |
| 4,443,085 | 4/1984 | Tomori et al. | 354/286 |
| 4,527,879 | 7/1985 | Hosoe et al. | 354/400 |
| 4,824,207 | 4/1989 | Kamata et al. | 350/255 |

Primary Examiner—Bruce Y. Arnold
Assistant Examiner—Loha Ben
Attorney, Agent, or Firm—Fitzpatrick, Cella, Harper & Scinto

[57] ABSTRACT

A built-in motorized lens mounting includes a fixed tube, a zoom actuating ring axially movably supported relative to the fixed tube, a focusing lens holder movably supported at least in the axial direction relative to the zoom actuating ring, an electric motor fixedly secured to the zoom actuating ring, and a driving power transmitting system using the rotation of the motor as a drive source to move the lens holder axially relative to the zoom actuating ring.

19 Claims, 3 Drawing Sheets

LENS MOUNTING

BACKGROUND OF THE INVENTION

1. Field of the Invention

This invention relates to lens mountings, and more particularly to a mounting mechanism adapted to interchangeable lenses for single lens reflex cameras or the like.

2. Description of the Related Art

It has been known in the art to provide a mechanical mounting unit for a zoom lens having the auto-focus device incorporated therein in the interchangeable form to the single lens reflex camera.

For this kind of mechanical mounting unit, the zoom lenses have generally been so designed that the front lens group is axially moved forward to increase the focal length of the entire system by manipulating the zoom ring, while automatic focusing is performed by axially moving that front lens group with the help of an electric motor in such a way that the total focusing movement is far shorter than the total zooming movement.

There are known many lenses having motorized operating mechanisms for the diaphragm unit, or the focusing lens and the zoom components.

The motors incorporated within the casings of the conventional lens mounting units can be classified as the pencil (solid) type, i.e. iron core motors, coreless motors and brushless motors, and the hollow type known in Japanese Laid-Open Patent Application Nos. SHO 56-51328 and 56-147131.

The prior known techniques of incorporating the motor within the casing had, in the case of the former or pencil type, either to shape the casing with an awkward projection to accommodate the motor, or, for the prevention of such a projection from appearing, to increase one of the axial separations between the components of the optical system, or to unduly largely decrease the effective diameter of the rear component, producing the drawback that unless particular care was taken in the lens design, the bulk and size of the casing becomes large, and the production cost increases.

In the case of the latter or hollow type, because the rotor and stator of the motor are arranged on respective barrel members at the inner and outer surfaces confronting each other, a great increase in the complexity of mounting mechanism occurs.

In the prior known mechanical mounting unit for the above-described kind of auto-focus zoom lens, because the motor was located on the stationary member near the annular ferrule of the mounting unit, as the front lens group is at the front terminal end of zooming movement, the distance between the motor and the front lens group holder was so long that no gear train could be found as a driving torque transmission. As such means, use was made of a spline shaft. Another method is to employ a driven gear of extremely long face width.

In the prior art of zoom lens mountings besides the drawbacks that the driving torque transmission system was complicated in structure and of large scale, because the frictional power loss and the load torque of the transmission system were increased to an undesirably large extent, a large consumption of kinetic energy resulted. To compensate for this, a larger motor than necessary is deployed.

Therefore, the use of the conventional method of incorporating a motor in the zoom lens mounting unit leads to a serious problem that the bulk and size became larger with an increase in the weight and, moreover, the manufacturing cost and the operating cost are very high.

SUMMARY OF THE INVENTION

An object of the invention is to provide a lens mounting of small size and light weight with a low manufacturing cost.

Other objects of the invention will become apparent from the following detailed description.

DETAILED DESCRIPTION OF THE PREFERRED EMBODIMENT

Figure 1:
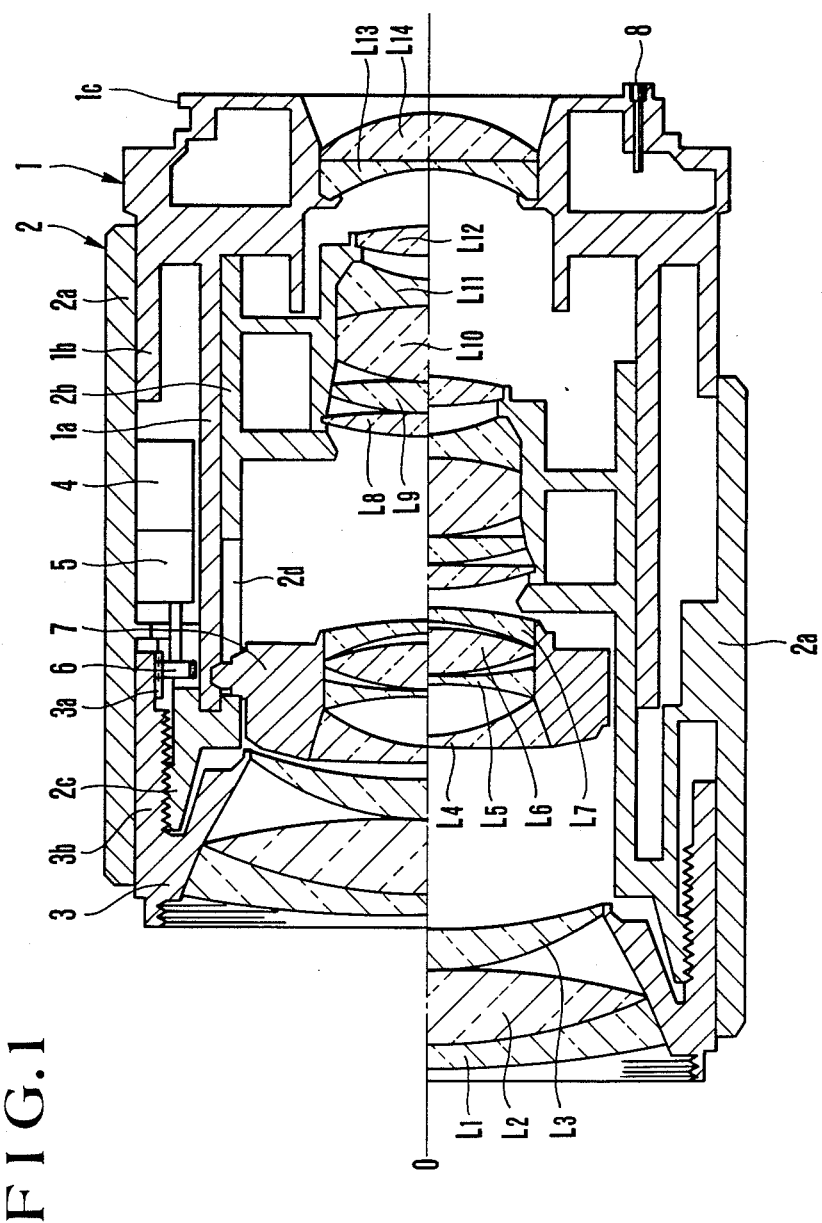
FIG. 1 is a longitudinal section view of a first embodiment of the lens mounting according to the present invention.

FIG. 1 illustrates the first embodiment of the invention with the upper half in the shortest focal length setting and the lower half in the longest focal length setting.

In the figure, a tubular body 1 to be fixed to the camera body (or fixed barrel) is formed partly to doubled tubes, of which the inner tube 1a is elongated frontward to a far longer length than the outer one 1b. Its rear end in the form of an annular ferrule 1c has bayonet pawls for coupling with the camera body. The annular ferrule 1c holds a fourth group of lenses $L_{13}$ and $L_{14}$ in its aperture and is provided with a plurality of electrical connection terminals 8 (though shown only one in number) through which an electric motor to be described later is given a control signal and supplied with current. In the front end portion of the inner body tube 1a there is a lens holder 7 containing a second group of lenses $L_4$–$L_7$ arranged to axially move a very short maximum distance.

A zoom actuator 2 is formed to a double tube structure likewise as the fixed barrel, and movably fitted on the latter only in axial directions. This zoom actuator 2 has a long outer barrel 2a axially movably fitted on the outer tube 1b, and a short inner barrel 2b axially movably fitted in the inner diameter of the inner tube 1a. The front end of the inner barrel 2b has a screw-threaded portion 2c meshing with a screw-threaded portion 3b of a lens holder 3 containing a front or first group of lenses $L_1$–$L_3$. In a position near the rear end of the inner barrel 2b there is held a third group of lenses $L_8$–$L_{12}$. An axially elongated slot 2d is formed through the wall of the front part of the inner barrel 2b. The front and rear ends of the slot 2d have the function of finely adjusting the axial position of the second lens group holder 7 in engagement with the support point of the latter when the zoom actuator 2 is moved to either of very short regions contiguous to the limits of the zooming range. It is, however, in the intervening region that the slot 2d has the role of preventing mechanical interference between the inner barrel 2b and the second lens group holder 7.

Within the annular air space between the inner body tube 1a and the outer barrel 2a of the zoom actuator 2, an electric motor 4 for automatic focusing, a speed reduction mechanism 5 and a pinion 6 on the output shaft of the speed reduction mechanism 5 are arranged in an axial row, the motor 4 and the speed reduction mechanism 5 being fixedly secured to the inner surface of the outer barrel 2a of the zoom actuator 2. The motor 4 is electrically connected to the terminals 8 through lead wires (not shown) so that the electrical power and the control signal respectively from the battery and the control circuit both within the camera body are given to the motor 4.

The pinion 6 meshes with an internal gear 3a fixedly secured to the inner diameter of the first lens group holder 3 (that is, fixedly carrying the front lens group) at the rear end thereof, which is able to axially move while simultaneously rotating relative to the zoom actuator 2 by virtue of the meshing engagement between the screw-threaded portions 2c and 3b respectively formed in the outer surface of the inner barrel 2b of the zoom actuator 2 and in the inner surface of the first group holder 3.

Next we explain the operation of each part of the interchangeable mechanical mounting unit for autofocus zoom lens of the structure described above of the invention when in use with the camera body, and its management.

When attaching the aforesaid lens mounting unit to the camera body, the photographer first puts the annular ferrule 1c in contact with the lens mount on the camera body and then turns it to bring the bayonet pawls into tightened engagement with those of the lens mount. In this initial stage, the lens mounting unit is assumed to be in the shortest focal length setting as shown in the upper half of FIG. 1.

To shoot with a larger image magnification than that in the initial setting, the photographer needs to slidingly move the zoom actuator 2 frontward (to the left as viewed in FIG. 1) by grasping the outer barrel 2a with his left hand, while his right hand holds the camera body stationary. Thereby the inner barrel 2b is axially moved forward as it is guided by the inner body tube 1a. Therefore, the first lens group holder 3 also is moved as a unit with the zoom actuator 2 to the left from the position shown in the upper half of FIG. 1, finally reaching a position shown in the lower half. The maximum axial movement of the zoom actuator 2 is equal to the length of the axially elongated slot 2d.

During the aforesaid zooming, when the zoom actuator 2 comes to a point very near the limit of the zooming range, the rear end of the slot 2d contacts with the support connection pin radially extending from the second lens group holder 7. After that, the second lens group holder 7 is moved a very short distance along with the zoom actuator 2. Hence, the image shift resulting from the forward movement of the third group of lenses $L_8$-$L_{12}$ up to a position just behind the second group of lenses $L_4$-$L_7$ is compensated for by such a slight movement of the latter.

Meanwhile, in accompaniment with the forward movement of the zoom actuator 2, the motor 4 and the speed reduction mechanism 5 also move ahead along with it. But, because the first lens group holder 3 also moves ahead along with the zoom actuator 2, the relative meshing position of the pinion 6 to the inner gear 3a of the first lens group holder 3 is maintained constant throughout.

After having set the desired image magnification, the photographer pushes down the release button on the camera body to the first stroke, thereby rendering a range finder operative. If the image is not in focus, the direction in which the front or focusing lens group $L_1$-$L_3$ must be axially moved to bring the image into focus and its amount are automatically determined. A signal representing the values of these variables is transmitted from the control circuit in the camera body through one of the interconnection terminals 8 to the motor 4. Therefore, the motor 4 rotates by a corresponding amount of revolution in response to that signal, while the motion of the motor 4 is transmitted through the speed reduction mechanism 5 to the pinion 6 and therefrom to the first lens group holder 3. Hence, the first lens group holder 3, due to the meshing relation of its screw-threaded portion 3b with the screw-threaded portion 2c of the inner barrel 2b of the zoom actuator 2, while rotating about the optical axis, is driven to move axially by virtue of the axial pitch of the screw-threaded portion 2c to effect focusing. In this case, because the first lens group holder 3 moves axially relative to the zoom actuator 2, the internal gear 3a is moved along relative to the pinion 6. But, the total focusing movement is usually very short. Therefore, the face width of the internal gear 3a is not very large, and the frictional resistance between them cannot be increased too much.

As has been described above, in the first embodiment of the lens mounting, with the focusing lens holder (the first lens group holder) on the zoom actuator, the drive device for automatic focusing comprised of the motor and speed reduction mechanism is positioned on the zoom actuator. Accordingly, there is no need to use a spline shaft or the like in the torque transmission mechanism from the drive device to the focusing lens holder. As a result, a torque transmission mechanism of smaller size and simpler structure than was heretofore possible can be used in the lens mounting of the invention. In addition, because the consumption of kinetic energy lowered, the size of that motor also can be reduced.

According to this embodiment of the invention, therefore, as compared with the conventional lens mounting, a valuable reduction in the size and weight is achieved. This leads to providing an inexpensive lens mounting which will work with a minimum cost.

Figure 2:
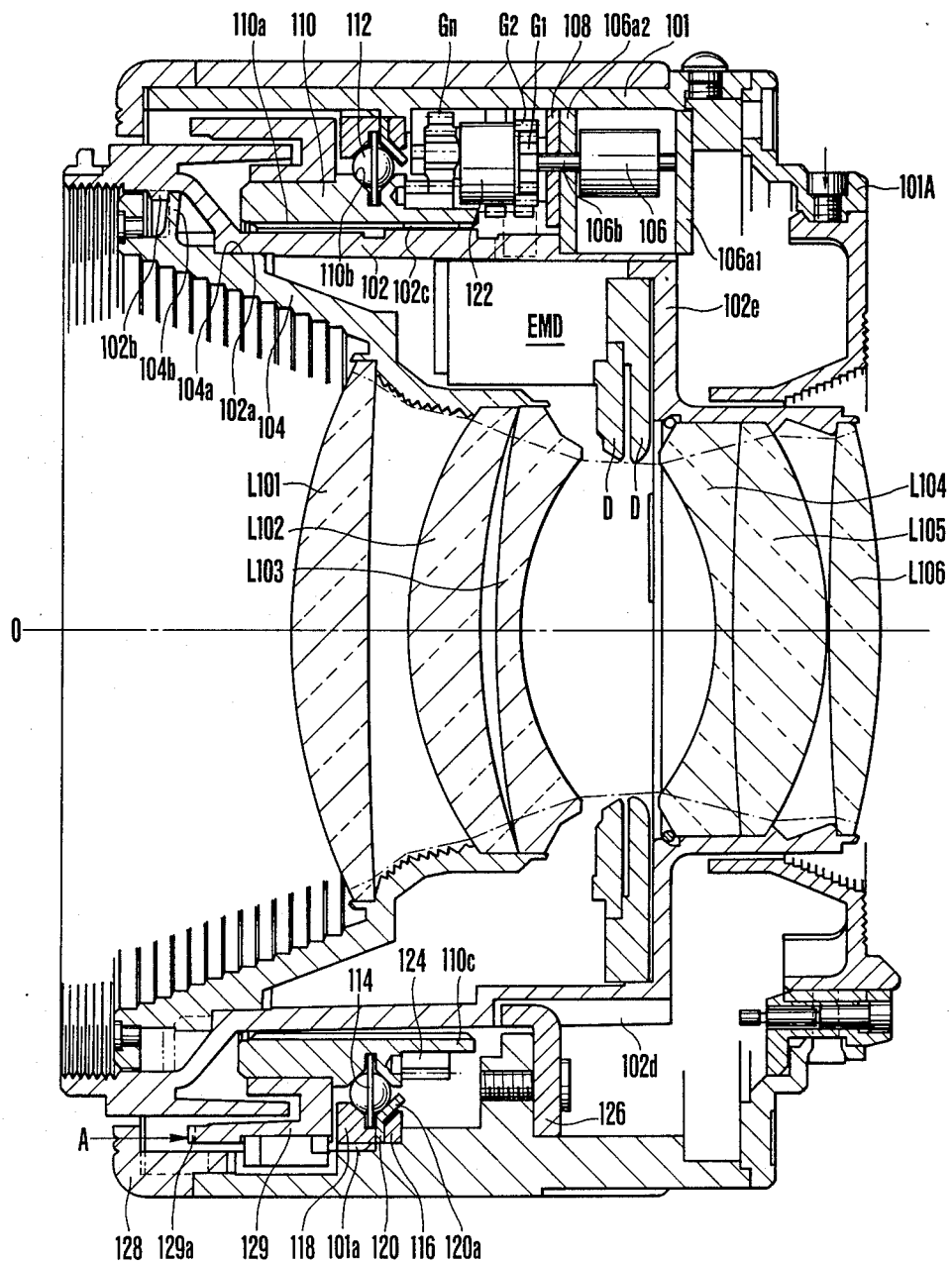
FIG. 2 is a longitudinal section view of a second embodiment of the lens mounting according to the present invention.

In FIG. 2 there is shown a second embodiment of the invention, where a body tube 101 has a bayonet type coupling member 101A at its rear end. First and second movable sleeves 102 and 104 hold respectively rear and front groups of lenses L104–L106 and L101–L103 both for focusing. The second sleeve 104 is formed to a frustum shape pointing to the rear except for the outer surface 104a of the front end portion which is fitted in the inner diameter of the over-bored front end portion 102a of the first sleeve 102 and fixedly secured to the latter by retaining means in the form of a plurality of resilient radial projections 104b extending outwardly of the front end of the second sleeve 104 when engaged against respective lobes 102b on the inner surface of the first sleeve 102.

A motor 106 which is carried on the body tube 101 is constructed with a stator consisting of yokes $106a_1$ and $106a_2$ and permanent magnet pieces (not shown) fixedly secured to the inner surface of the body tube 101 and a rotor consisting of coils and an output shaft 106b. A train of gears $G_1$–$G_n$ as the speed varying mechanism for the output shaft 106b is carried on a base plate 108 extending radially inwardly of the inner surface of the body tube 101.

A rotary ring 110 is arranged to rotate in a constant axial position relative to the body tube 101, and has a helicoid portion 110a formed in the inner surface thereof to mesh with a helicoid portion 102c which is formed in the outer surface of the first movable sleeve 102, and a circumferential groove 110b of letter "V"-shaped cross-section formed in the outer surface thereof as one of the paired races of a ball bearing 112 with a ball spacer 114.

The opposite race is formed with a first ring 116 fixedly fitted in the inner diameter of the body tube 101 with its inner front corner being tapered, a second ring 118 threadedly fitted in the inner diameter of the body tube 101 at a screw-threaded portion 101a, and an annular disc-like resilient spacer 120 rigidly supported in its outer half, of which the inner half 120a is inclined to conform at its root with the tapered surface of the first ring 116 and hangs over to provide a free end. By this bent-off portion 120a, the pressure on the balls 112 can be adjusted.

A position detector 122 such as an encoder is arranged within the gear trains G1-Gn. The outer diameter of that portion of the rotary ring 110 which lies just behind the ball bearing race 110b is reduced to a thickness 110c on which an external gear 124 is fixedly mounted, meshing with the last gear Gn as the output member of the speed varying mechanism.

It should be recognized that the above-described structure provides a space the motor 106 and the gearing mechanism G1-Gn occupy between the first movable sleeve 102 and the body tube 101 and assurance of this space by means of the constituent members 110, 116, 118 and 120 of the bearing mechanism for the balls 112 necessarily intervening between the body tube 101 and the movable sleeve 102.

A diaphragm unit D is fixedly secured both to the inner surface of the first movable sleeve 102 and a crosswall 102e of small aperture, and is automatically operated by an electric motor EMD which is also fixedly carried on the inner surface of the first movable sleeve 102.

The operation of this lens mounting is described below. With the lens mounting attached to a camera body (not shown), focusing control means in the camera body activates a drive circuit for the motor 106. Motion of the motor 106 is transmitted through the gearing mechanism G1-Gn to the rotary ring 110. By virtue of the ball bearing means 110b-120, the running rotary ring 110 is restrained from axial movement, but its rotation is transmitted to axial movement of the first and second movable sleeves 102 and 104 as a unit through the helicoid connection, because a key member 126 extends from the inner surface of the body tube 101 into an axially elongated key groove 102d formed in the outer surface of the first sleeve 102. Thus, motorized focusing of the lens system L101-L106 takes place.

This second embodiment has the feature that, as the focusing lens holder assembly 102, 104 is necessarily movably mounted within the interior of the body tube 101, use is made of a bearing mechanism therebetween as has been described above, and the space resulting from the use of such a mechanism is utilized to accommodate the motor 106 and the gear train G1-Gn for controlling the movable sleeves 102 and 104, thereby preserving the outer appearance of a cylindrical shape of the casing of the lens mounting over the entire length thereof. Another advantage is that the remaining portion of that space can be used to accommodate circuit elements constituting part of the drive circuit for the motor, as transposed from the inside of the camera body so that the structure of the interior of the camera body can be simplified.

Further, in the second embodiment, the entirety of the lens mounting is possible to be divided into two main units with an advantage of increasing the efficiency of the assembling operation of the lens mountings. In more detail, as the lens mounting is comprised of the optical system and the operating mechanism therefor, the first and second movable sleeves 102 and 104 of FIG. 2 are assembled to one unit of the optical system, while the motor, torque transmission mechanism and bearing means are assembled to one unit of the motorized operating mechanism. Then, these two units are assembled in such a way that the first movable sleeve 102 is placed in registry with the start point of rotation of the rotary ring 110, and the rotary ring 110 is rotated relative to the first movable sleeve 102 by using a tool rod inserted from the outside in a direction of arrow A parallel to the optical axis O into a detent slot 129a provided in the front face of an index ring 129 which is fixedly mounted to the rotary ring 110, until the lens system unit 102, 104, L101-L106 is fully installed within the mechanical unit.

After the optical system unit and the operating mechanism unit have been assembled, the body tube 101 is covered with a decoration barrel 128.

As has been described above, according to the second embodiment, the lens system is all disposed on the movable part of the mechanical mounting, while the motorized operating mechanism is all positioned on the stationary part, thus enabling a great increase in the efficiency of the assembly line to be achieved.

A third embodiment of the invention is next described by reference to FIG. 3, as applied to a zoom lens whose two components axially move in opposite directions to effect zooming, and whose focusing is performed by axially moving the front component alone.

Figure 3:
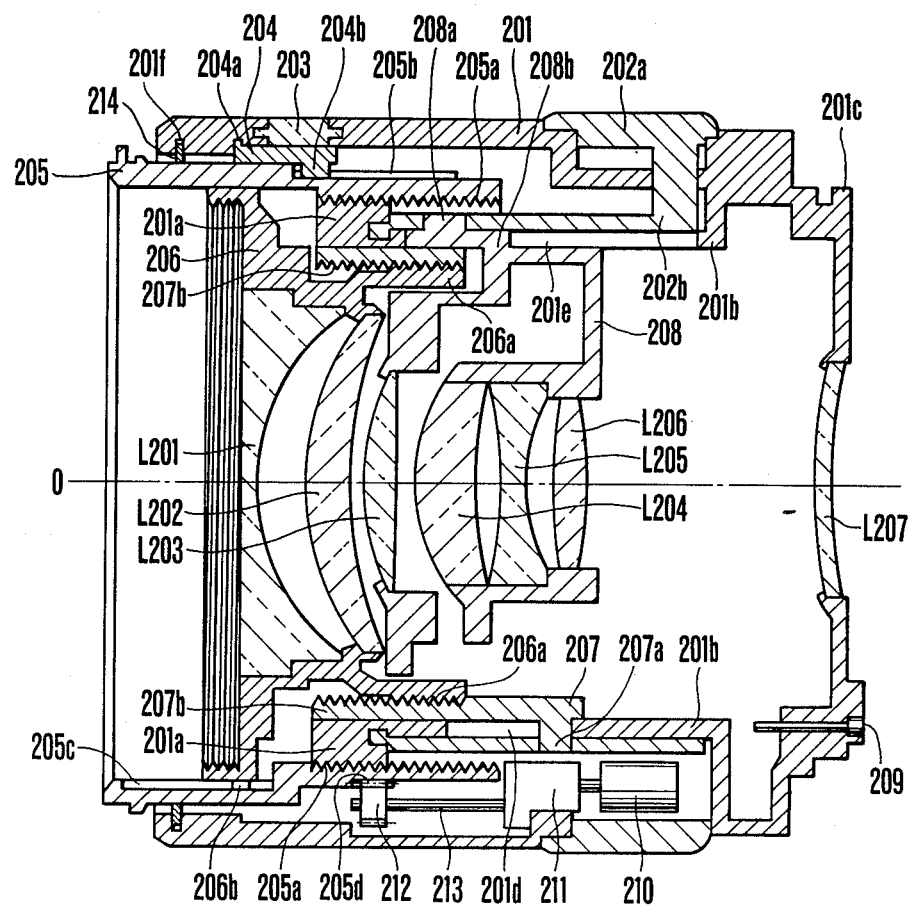
FIG. 3 is a longitudinal section view of a third embodiment of the lens mounting according to the present invention.

In FIG. 3, an outer body tube 201 is formed as a unit with an inner body tube 201b with a radial separation therebetween. Thus, the body of the lens mounting is constructed in a doubled cylindrical structure. The rear end of this body has the shape of an annular ferrule having coupling pawls 201c to engage with a lens mount on a camera body and containing a lens L207 at its aperture. A zoom actuator or ring 202a is manually rotatably fitted in a circumferential groove formed in the outer surface of the outer body tube 201 at a location near the end thereof. Near the front end of this tube 201 there is an opening with a fitted window 203 having an index mark to cooperate with a distance scale on a ring 204 rotatably fitted in the inner diameter of the outer body tube 201 in radial alignment with the window 203 so that the distance scale can be viewed therethrough. A projection 204a extends radially outwardly of the distance scale ring 204 into a circumferential groove in the inner surface of the outer body tube 201 so that the scale ring 204 can rotate relative to the outer body tube 201, but cannot axially move relative thereto. Another projection 204b extends radially inwardly of the scale ring 204 into an axially elongated groove 205b formed in the outer surface of a distance adjusting sleeve 205 so that, as the sleeve 205 has an axial pitch, its rotation causes simultaneous rotation of the scale ring 204 but permits the latter to remain in a constant axial position.

Within the annular space between the inner and outer body tubes 201b and 201 there are arranged, besides a sleeve 202b formed as a unit with the zoom ring 202a, a distance adjusting sleeve 205, a pinion 212 for driving rotation of the distance adjusting sleeve 205, a drive shaft 213, a speed reduction mechanism 211 and an electric motor 210 for automatic focusing, the speed reduction mechanism 211 and the motor 210 being fixedly secured to the inner surface of the outer body tube 201.

Two axially elongated slots 201d and 201e are formed through the wall of the inner body tube 201b. A movable intermediate sleeve 207 and a lens holder 208 containing a rear lens group are movably fitted in the inner diameter of the inner body tube 201b and have projections 207a and 208b respectively extending into the slots 201d and 201e.

The intermediate sleeve 207 has the function of allowing for axially movement a front lens holder 206 containing lens elements L201 and L202 independently of the rear lens holder 208. For this purpose, the intermediate sleeve 207 is provided with a screw-threaded portion 207b formed in the inner surface thereof to mesh with a screw-threaded portion 206a in the outer surface of the front lens holder 206.

The projection 207a extends from the intermediate sleeve 207 into a camming slot of the zoom sleeve 202b. Meanwhile, the rear lens holder 208 containing lens elements L203–L206 has a projection 208a extending into another camming slot of the zoom sleeve 202b.

These two camming slots are so oriented that when the zoom sleeve 202a rotates, the intermediate sleeve 207 or the front lens holder 206, and the rear lens holder 208 are axially moved in opposite directions from each other, while being restrained from rotation by projection 207a and by projection 208b; and engaging in the guide slots 201d and 201e, respectively.

In order to translate rotation of the front lens holder 206 into its axial movement relative to the distance adjusting sleeve 205, an axially elongated groove 205c is formed in the inner surface of the distance adjusting sleeve 205. A restraining projection 206b extends from the outer surface of the front lens holder 206 into the groove 205c. Since the screw-threaded portion 206a in the outer surface of the front lens holder 206 meshes with the screw-threaded portion 207 of the intermediate sleeve 207 which is movable almost only in the axial directions, the front lens holder 206 rotates along with the distance adjusting sleeve 205 and, at the same time, axially moves within the distance adjusting sleeve 205.

The distance adjusting sleeve 205 is a driving torque transmitting member for automatically focusing the front lens holder 206 and is provided with an external gear 205d on the outer surface thereof always meshing with the pinion 212.

Formed in the inner surface of the rear end portion of the distance adjusting sleeve 205 is a screw-thread 205a meshing with a screw-threaded portion 201a in the outer surface of the front end portion of the inner body tube 201b. Therefore, when the pinion 212 rotates, the distance adjusting sleeve 205 is rotated while moving axially relative to the inner body tube 201b, and, at the same time, its rotation is transmitted through the projection 206b-and-groove 205c connection to the front lens holder 206.

A circumferential groove 201f is engraved in the inner surface of the front end of the outer body tube 201. A dust-proof ring 214 is fitted in the groove 201f. By this dust-proof ring 214, dust is prevented from entering the gap between the inner surface of the outer body tube 201 and the outer surface of the distance adjusting sleeve 205.

The dust-proof ring 214 is made of, for example, flexible synthetic resin of small frictional coefficient and is so designed that its inner diameter is slightly larger than the outer diameter of the distance adjusting sleeve 205 and its outer diameter is slightly smaller than the diameter of the bottom of the circumferential groove 201f. Therefore, a very minute gap exists between the inner periphery of the dust-proof ring 214 and the outer periphery of the distance adjusting sleeve 205, and a considerably larger gap than that gap exists between the outer periphery of the dust-proof ring 214 and the bottom of the circumferential groove 201f. For this reason, even when the axis of the distance adjusting sleeve 205 is angularly offset from that of the body tube 201 to so large an extent that the sleeve 205 contacts the dust-proof ring 214, because the dust-proof ring 214 can furthermore displace itself radially, there is no possibility of producing a strong friction between the distance adjusting sleeve 205 and the dust-proof ring 214. Hence, the distance adjusting sleeve 205 can be operated without grating or biting. Also since the dust-proof ring 214 is flexible and has a small frictional coefficient, even if the distance adjusting sleeve 205 is one-sided to press the dust-proof ring 214, the frictional force therebetween can never increase objectionably.

As the motor 210 lies within the lens mounting, there are provided connection terminals 209 constituting part of an electrical transmission system for supplying current and a control signal to the motor 210. These terminals 209 are arranged in the annular ferrule 201c to contact those on a camera body (not shown) when the lens mounting is attached to the camera body, so that the electrical connections between the motor 210 and the battery and the control circuit both in the camera body are established.

When using the lens mounting of the invention along with the camera body, the operator first puts the annular ferrule 201c in the lens mount of the camera body and then turns the lens mounting about the optical axis until the coupling means on the ferrule 201c rigidly engages that on the camera body. At the termination of this coupling operation, the connection terminals 209 come to contact with those on the camera body so that not only the electrical power source but also the control circuit including the range finder is connected to the motor 210. Hence, automatic focusing is possible to operate.

Just after the lens mounting has been attached to the camera body, the optical system in the lens mounting has a position in which the front group of lenses L201 and L202 and the rear group of lenses L203–L206 are closest to each other as has been described above. In this setting, the focal length of the photographic lens system takes a maximum value suited for tele photography.

To change over from the illustrated position to a shorter focal length position (for wide angle photography), the photographer turns the zoom ring 202a about the axis. The sleeve 202b, forming one unified piece with the zoom ring 202a also turns. Therefore, the camming slots of the sleeve 202b move the respective projections 207a and 208b axially as guided by the 201d and 201e, so that the intermediate sleeve 207 moves forward and the rear lens holder 208 moves rearward. During this time, the intermediate sleeve 207 carries the front lens holder 206 in stationary engagement at their screw-threaded portions 207b and 206a. Therefore, such forward movement of the intermediate sleeve 207 causes simultaneous forward movement of the front group of lenses L201 and L202. Hence, the spacing between the front group of lenses L201 and L202 and the rear group of lenses L203–L206 is widened with a decrease in the focal length of the entire system. Thus, wide angle photography becomes possible.

During this time, although the projection 206b on the front lens holder 206 engages the axially elongated slot 205c in the inner surface of the distance adjusting sleeve 205, because the zooming movement of the front lens holder 206 is in the axial direction, the distance adjusting sleeve 205 is not driven to rotate at any rate, and the meshing engagement of the pinion 212 with the external gear 205d on the distance adjusting sleeve 205 has an unchanged in axial position.

Then, for automatic focusing, when the release button on the camera housing is operated, the range finder within the camera body automatically measures the distance from the camera to an object to be photographed, and the control circuit in the camera body computes the distance the focusing lens group L201–L202 must move to bring the image into focus. A control signal based on this computation is applied from the camera body through the interconnection terminal 209 to the motor 210. In response to this control signal, therefore, the motor 210 rotates. Its rotation after having been reduced by the speed reduction mechanism 211, is transmitted through the drive shaft 213 to the pinion 212. Thus, the pinion 212 rotates the distance adjusting sleeve 205 through the meshing engagement with the external gear 205d.

Such rotation of the distance adjusting sleeve 205 causes rotation of the front lens holder 206 by the projection 206b. Since the intermediate sleeve 207 is restrained not only always from rotation but also, for this time only, from axial movement by the camming slot of the sleeve 202b as the zoom ring 202a is held stationary, the rotation transmitted from the distance adjusting sleeve 205 to the front lens holder 206 is translated by the connection of the screw-threaded portions 206a and 207b to axial movement of that holder 206. As a result, the front or focusing lens holder 206 is axially moved a distance proportional to the amount of rotation of the distance adjusting sleeve 205. Therefore, when the front group of lenses L201 and L202 is axially moved by the computed distance by the control circuit, the image is brought into sharp focus automatically. Since, at this time, the distance scale ring 204 also rotates along with the distance adjusting sleeve 205, the distance to the object can be seen by looking at the index on the window 203 in cooperation with the distance scale calibrated on the outer surface of the ring 204.

Meanwhile, when the distance adjusting sleeve 205 is rotated, the meshing relationship of the screw-threaded portion 205a provided in the inner surface of the distance adjusting sleeve 205 with the screw-threaded portion 201a in the outer surface of the front end portion of the inner body tube 201b exerts also axial movement of the distance adjusting sleeve 205. But, the teeth of the paired screw-threaded portions 205a and 201a and those of the paired screw-threaded portions 206a and 207b are designed to be equal to each other in the lead so that when the distance adjusting sleeve 205 is rotated, the amount of axial movement of the distance adjusting sleeve 205 is equal to that of axial movement of the front lens holder 206. But, the the external gear 205d is formed to a helical lead shape. Even when the distance adjusting sleeve 205 moves axially, therefore, gear 205d is not taken out of meshing engagement with the drive pinion 212.

Also, even when the distance adjusting sleeve 205 moves axially, the scale ring 204, because of its projection 204b engaging in the axially elongated slot 205b of the distance adjusting sleeve 205, is not moved axially by the axial movement of the distance adjusting sleeve 205, and thus is permitted always to only rotate in radial alignment with the distance scale display window 203. Therefore, although the distance adjusting sleeve 205 moves axially, the distance scale never disappears from the distance scale display window 203.

As the distance adjusting sleeve 205 is being moved forward away from the outer body tube 201, if the distance adjusting sleeve 205 is not decentered in respect to the outer body tube 201 at all, a slight clearance is kept between the inner periphery of the dust-proof ring 214 and the outer surface of the distance adjusting sleeve 205. But, if the distance adjusting sleeve 205 is slightly one-sided relative to the outer body tube 201, or if there is a backlash at the support of the distance adjusting sleeve 205, the outer surface of the distance adjusting sleeve 205 will contact with the inner periphery of the dust-proof ring 214. Then, the dust-proof ring 214 receives a force in the radial direction from the distance adjusting sleeve 205. In this embodiment, however, there is provided a gap between the outer periphery of the dust-proof ring 214 and the bottom of the circumferential groove 201f so that the dust-proof ring 214 can displace itself radially. Therefore, even if the outer surface of the distance adjusting sleeve 205 comes into contact with the inner periphery of the dust-proof ring 214, there is no possibility of the exertion of a large frictional force therebetween and of the occurrence of biting or grating at all. Hence, it is insured that the distance adjusting sleeve 205 always smoothly moves.

As has been described above, in the third embodiment of the invention, the lens mounting is provided with means for preventing dust or foreign particles from migrating into the clearances between the fixed member and the movable members in order to insure that no faulty automatic-focusing operation takes place.

What is claimed is:

1. A lens mounting, comprising:
   a fixed tube;
   a cylindrical zoom actuating ring axially movably supported on and relative to said fixed tube;
   a focusing lens holding member movably supported at least in the axial direction on and relative to said zoom actuating ring;
   an electric motor fixedly secured to, and inside said zoom actuating ring; and
   a driving power transmitting means using rotation of said motor as a drive source for axially moving said focusing lens holding member relative to said zoom actuating ring,
   wherein said driving power transmitting means includes a speed reduction transmission system for reducing the speed of the output of said motor, and an axially moving transmission system for axially moving said focusing lens holding member relative to said zoom actuating ring upon receiving the output of said speed reduction transmission system, and said motor and said speed reduction transmission system being arranged at positions at substantially the same distance from the optical axis in a radial direction.

2. A lens mounting according to claim 1, wherein said focusing lens holding member is rotatably supported on and relative to said zoom actuating ring.

3. A lens mounting according to claim 2, wherein rotation of said motor is transmitted to said focusing lens holding member, rotating said focusing lens holding member relative to said zoom actuating ring, said zoom actuating ring and said focusing lens holding member being helicoid-connected to each other so that said lens holding member is moved axially relative to said zoom actuating ring by rotation of said focusing lens holding member.

4. A lens mounting according to claim 3, wherein said focusing lens holding member moves axially in following-up relation when said zoom actuating ring moves axially to effect zooming.

5. A lens mounting according to claim 1, wherein said speed reduction transmission system comprises an output gear, wherein said axially moving transmission system comprises a geared portion meshing with said output gear of said speed reduction transmission system.

6. A lens mounting according to claim 1, wherein said motor and said speed reduction transmission system are fixedly secured to said zoom actuating ring.

7. A lens mounting comprising:
a fixed tube;
a movable ring structure holding a focusing lens, and having formed in the outer peripheral surface thereof a helicoid portion, said movable ring structure being axially movably supported on and relative to said fixed tube;
said fixed tube being arranged on the outer diameter side of said movable ring structure in spatial relationship therewith;
bearing means positioned in a radial space between the inner diameter of said fixed tube and the outer diameter of said movable ring structure, wherein said bearing means comprises ball bearings;
a motor structure arranged in said radial space and comprising an output gear; and
a rotatable sleeve member being rotated by said output gear of said motor structure, said rotatable sleeve member constituting part of said bearing means and having a helicoid portion in meshing engagement with said helicoid portion of said movable ring structure, so that said movable ring structure moves axially when said rotatable sleeve member rotates, wherein said rotatable sleeve member is provided with a recessed portion formed in the outer peripheral surface thereof to bear said ball bearings.

8. A lens mounting according to claim 7, further comprising a diaphragm unit fixedly secured to an inner diametrical surface of said movable ring structure.

9. A lens mounting according to claim 7, wherein said motor structure comprises an electric motor and gears for decreasing the speed of the output of said motor.

10. A lens mounting comprising:
(a) fixed outer tube;
(b) a movable inner tube contained in the inner diameter of said fixed outer tube and arranged upon distance adjustment to move axially forward away from the front end of said fixed outer tube; and
(c) a dust-proof ring for preventing dust from entering into the interior of said fixed outer tube at the gap between the outer peripheral surface of said movable inner tube and the inner peripheral surface of said fixed outer tube, said dust-proof ring being fixedly secured to the inner peripheral surface of the front end portion of said fixed outer tube.

11. A lens mounting according to claim 10, wherein said dust-proof ring is fitted in a circumferential groove formed in the inner peripheral surface of the front end portion of said fixed outer tube, a clearance being kept between the inner peripheral surface of said circumferential groove and the outer peripheral surface of said dust-proof ring to make it possible for said dust-proof ring to displace itself radially.

12. A lens mounting according to claim 11, wherein said dust-proof ring is made of a synthetic resin material having a flexibility.

13. A lens mounting according to claim 10, wherein said dust-proof ring is made of a synthetic resin material having a flexibility.

14. A lens mounting, comprising;
a fixed tube;
a cylindrical zoom actuating ring axially movably supported on and relative to said fixed tube;
a focusing lens holding member movably supported at least in the axial direction on and relative to said zoom actuating ring;
an electric motor fixedly secured to, and inside said zoom actuating ring;
driving power transmitting mechanism using the rotation of said motor as a drive source for axially moving said focusing lens holding member relative to said zoom actuating ring, said driving power transmitting mechanism includes a threaded mechanism for axially moving said focusing lens holding member relative to said zoom actuating ring, said threaded mechanism and said motor being arranged at positions at substantially the same distance from the optical axis in a radial direction.

15. A lens mounting according to claim 14, wherein said driving power transmitting mechanism includes a speed reduction transmission system for reducing the speed of the output of said motor.

16. A lens mounting according to claim 14, wherein said focusing lens holding member comprises a geared portion meshing with an output gear as an output of said motor.

17. A lens mounting according to claim 14, wherein rotation of said motor is transmitted to said focusing lens holding member, rotating said focusing lens holding member relative to said zoom actuating ring, said zoom actuating ring and said focusing lens holding member being threaded to each other so that said lens holding member is moved axially relative to said zoom actuating ring by rotation of said focusing lens holding member.

18. A lens mounting according to claim 17, wherein said focusing lens holding member moves axially in a following-up relation when said zoom actuating ring moves axially to effect zooming.

19. A lens mounting according to claim 14, wherein said driving power transmitting mechanism includes at least a speed reduction system for decreasing the speed of the output of said motor, and said motor and said speed reduction system are fixedly secured to said zoom actuating ring.

* * * * *

UNITED STATES PATENT AND TRADEMARK OFFICE
CERTIFICATE OF CORRECTION

PATENT NO. : 4,865,432

DATED : September 12, 1989

INVENTOR(S) : Masao Aoyagi, et al.

It is certified that error appears in the above-identified patent and that said Letters Patent is hereby corrected as shown below:

COLUMN 1:

Line 59, "mountings" should read --mountings,--.

COLUMN 4:

Line 41, "lowered," should read --is lowered,--.

COLUMN 7:

Line 21, "axially movement" should read --axially moving--.

COLUMN 9:

Line 1, "the 201d" should read --the slots 201d--.

Line 22, "in" should be deleted.

UNITED STATES PATENT AND TRADEMARK OFFICE
CERTIFICATE OF CORRECTION

PATENT NO. : 4,865,432　　　　　　　　　　　　Page 2 of 2
DATED     : September 12, 1989
INVENTOR(S) : Masao Aoyagi, et al.

It is certified that error appears in the above-identified patent and that said Letters Patent is hereby corrected as shown below:

COLUMN 12:

Line 23, "comprising;" should read --comprising:--.

Line 31, "ring;" should read --ring; and--.

Line 32, "driving power transmitting mechanism" should read --a driving power transmitting mechanism--.

Signed and Sealed this

Twenty-fifth Day of June, 1991

*Attest:*

HARRY F. MANBECK, JR.

*Attesting Officer*　　　*Commissioner of Patents and Trademarks*